J. GIERKE.
SELF CLEARING GILL NET LIFTING MACHINE.
APPLICATION FILED APR. 13, 1908.
948,760.
Patented Feb. 8, 1910.
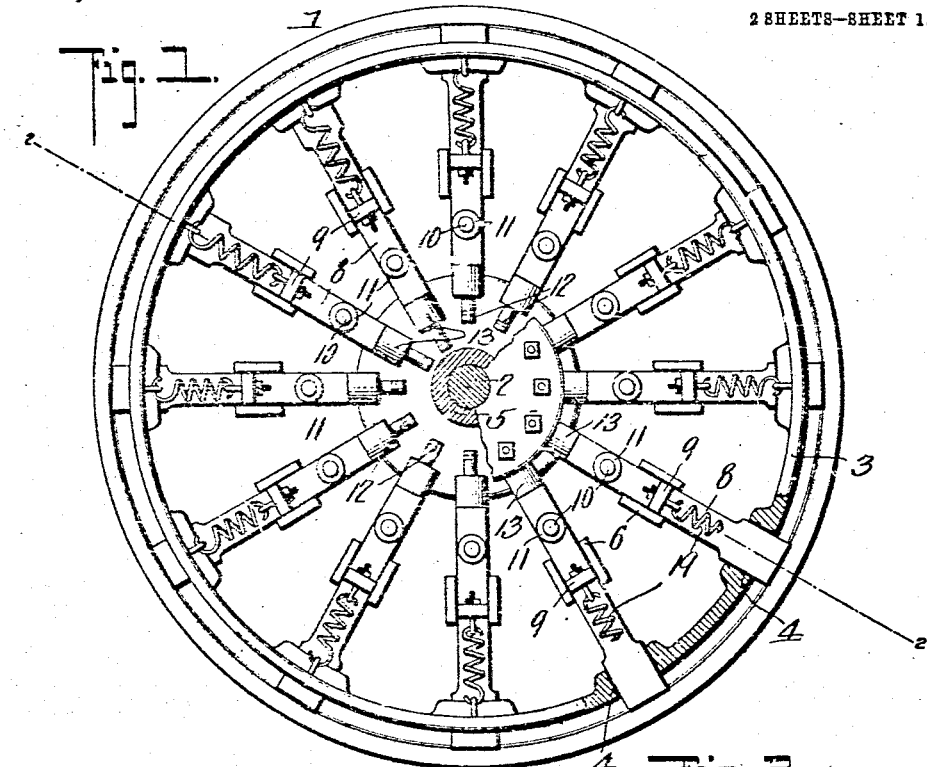
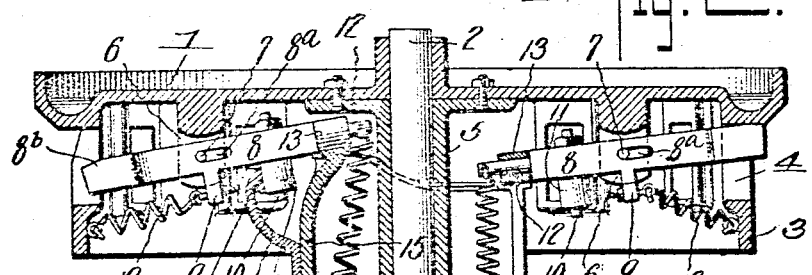
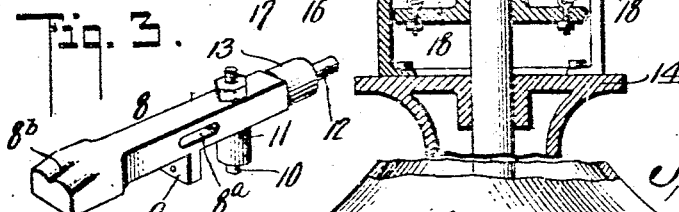
John Gierke, Inventor

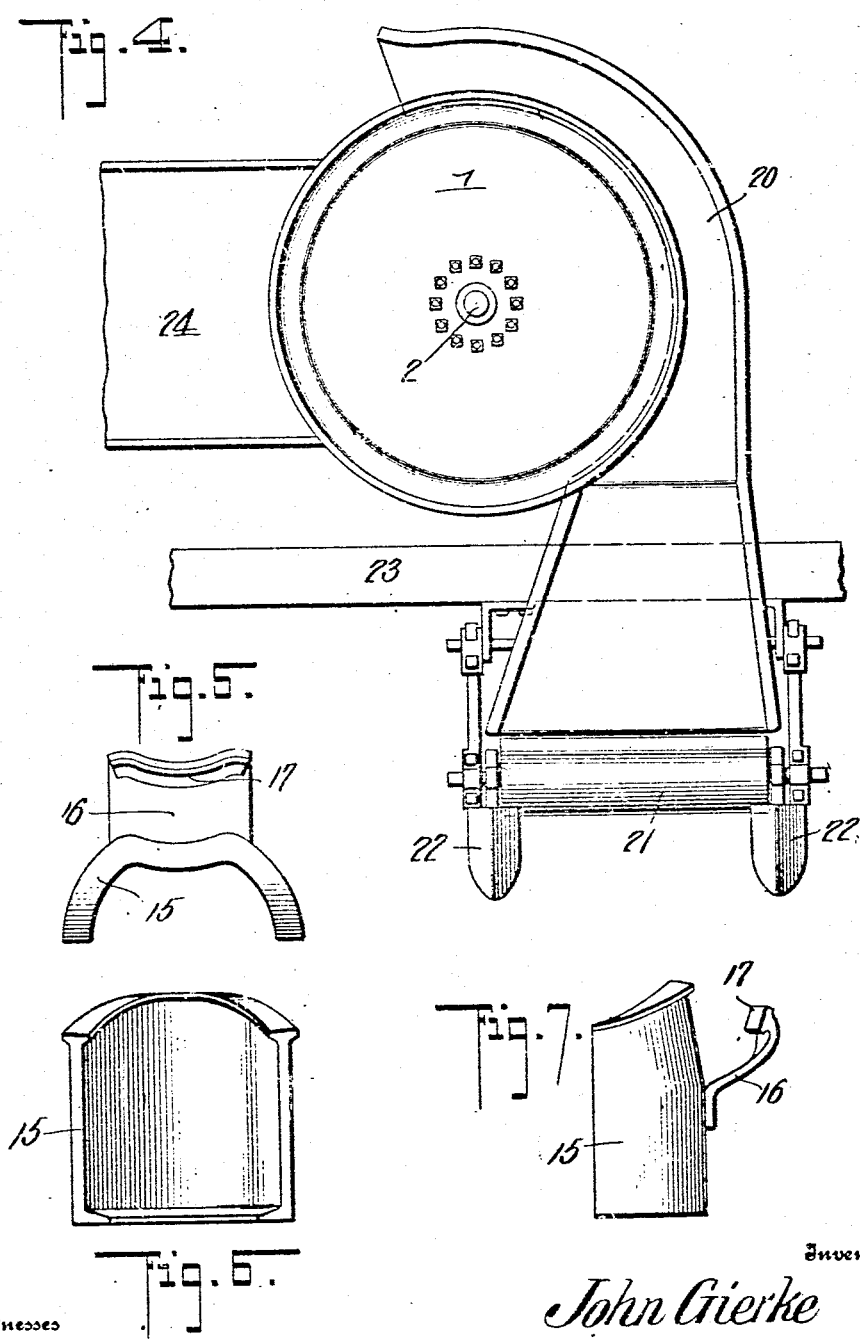

UNITED STATES PATENT OFFICE.

JOHN GIERKE, FAYETTE, MICHIGAN.

SELF-CLEARING GILL-NET-LIFTING MACHINE.

948,760. Specification of Letters Patent. Patented Feb. 8, 1910.

Application filed April 13, 1908. Serial No. 426,863.

*To all whom it may concern:*

Be it known that I, JOHN GIERKE, a citizen of the United States, residing at Fayette, in the county of Delta and State of Michigan, have invented a new and useful Improvement in a Self-Clearing Gill-Net-Lifting Machine, of which the following is a specification.

This invention relates to a self clearing gill net lifting machine, and the object of the invention is a device for drawing gill nets over the side of a vessel through a suitable trough and dropping the same into a suitable box.

The invention consists in a rotating drum provided with a plurality of radially arranged gripping arms which are automatically projected and withdrawn during rotation of the drum, the said arms engaging the sides of the net and carrying the same to the box and then dropping them.

The invention also consists in the novel features of construction hereinafter described, pointed out in the claims and shown in the accompanying drawings, in which—

Figure 1 is an inverted plan view of the drum, parts being broken away, and parts being shown in section. Fig. 2 is a section on the line 2—2 of Fig. 1. Fig. 3 is a detail view of one of the net-engaging arms. Fig. 4 is a top plan view of the device in position. Fig. 5 is a plan view of a track and a cam. Fig. 6 is a face view of the track. Fig 7 is a side elevation of the track and cam.

In these drawings 1 represents a drum rotating upon a shaft 2, which shaft extends downwardly through a suitable base 2ª, and is driven by any suitable means, as for example by belts and pulleys and a dinkie engine. This drum has a depending flange 3 which is cut out at suitable intervals as shown at 4. A flanged sleeve 5 is mounted upon the shaft 2 beneath the drum, the upper flange of the sleeve being secured to the top of the drum so that the sleeve rotates with the drum and shaft. The drum is also provided upon its under face with twelve pairs of depending ears 6, although this number may be increased or decreased if desired. Each pair of ears is provided with a pin 7 and an arm 8 works between the ears of a pair and is slotted as shown at 8ª, the pin 7 passing through the slot and limiting inner and outer movement of the arm between the ears. The outer end portion of the arm is provided with an inwardly extending groove 8ᵇ upon its upper face, thus forming the outer end of the arm into a jaw for gripping meshes of the net to be lifted, the said arm forming the movable member of a clamping jaw and the upper wall of the cut-out portion 4 through which the arm works forming the fixed member of the jaw. Each arm also carries a depending lug 9 arranged beneath the slot 8ᵃ, a depending pin 10 upon which is mounted a roller 11, and at its inner end the arm is provided with an inwardly projecting pin 12 upon which is mounted a roller 13. It will be understood that there are twelve arms, and twelve cut-out portions or slots 4, that the said arms are arranged radially beneath the top of the drum and within the flange 3, and spaced equi-distant apart.

Below the sleeve 5 a circular bracket 14 is secured upon the base 2ª and upon this bracket is mounted an irregular track 15, which extends upon a compound curve about half way around the shaft 2, and spaced from it, and the highest point of this track is midway its ends. The track 15 carries a bracket 16 upon which is mounted a cam track 17 of less length than the track 15 and shaped to conform to the curvature of that portion of the track 15 which is parallel to the cam track 17. Springs 18 are secured at their upper ends to the pins 12 and their lower ends to the lower flange of the sleeve 5, and springs 19 are secured at their inner ends to the lugs 9 and at their outer ends to the flange 3. The springs 18 lift the outer ends of the arm 8 by drawing down the inner ends, the pins 7 forming loose pivot points upon which the arms slide and turn, and the springs 19 draw the arms outwardly and downwardly at their outer ends to the extent permitted by the pins 7. I also place adjacent the drum and extending partially beneath it a curved trough 20, and upon the side of the vessel, and outside of the rail, I place a roller 21 provided with side guards 22.

The operation of the device is as follows:—
An end of the net is drawn over the roller 21 and across the rail of the vessel, shown at 23, and into the trough 20 where it is engaged with one of the arms 8, a mesh of the net being gripped between the arm and the top of one of the slots 4. The shaft 2 is then rotated and as the net is carried along the trough and around the drum the meshes of the net will be successively engaged by the other arms 8. As the net approaches a receiving box 24 the arms will be withdrawn from engagement with the meshes of the net by the rollers 13 riding upwardly upon the track 15, thereby lifting the inner ends of the arms against the tension of the springs 18, and as the roller 13 approaches the highest point of the track 15 the roller 11 will engage the inner side of the cam track 17, which track curves inwardly at this point, and the roller, and the arm which carries it, will be forced inwardly toward the shaft 2, said inwardly sliding movement taking place simultaneously with the lifting of the inner end of the arm and the lowering of the outer end. This withdrawal of the arm beneath the drum within the flange will disengage it from the net, and as the drum carries the arm around to its original position and the roller 11 clears the track 17 the spring 18 will draw down the inner end of the arm and the spring 19 will slide the arm outwardly so that it will again enageg a new portion of the net.

Having thus fully described my invention, what I claim as new and desire to secure by Letters Patent, is:—

1. A device of the kind described comprising a rotatable drum, radially movable arms carried by the drum, said arms engaging meshes of a net, and means for automatically moving said arms inwardly and out of engagement with the net when the rotation of the drum has brought the arms above a predetermined point.

2. A device of the kind described comprising a drum having a depending, slotted flange, net engaging means carried within the drum working through said slot, arms pivoted loosely within the drum, said arms having a rocking movement upon their pivotal points and a limited sliding movement upon a radial line, a spring mechanism for bringing said arms into engagement with the meshes of a net, and a cam mechanism for retracting said arms after a certain definite period of rotation.

3. A gill net lifting device comprising a slotted drum, radially extending arms loosely pivoted within said drum, and working through the slots, said arms having a sliding movement upon their pivot points, springs for drawing said arms outwardly, springs for drawing the inner ends of the arms downwardly, a track for lifting the inner ends of the arms through a certain period of rotation, and a cam mechanism for forcing the arms inwardly during passage of the arms over the highest portion of the track.

4. A device of the kind described comprising a rotatable slotted drum, arms mounted within the drum, said arms having a vertical swinging movement and a longitudinally slidable movement, means for moving said arms outwardly and upwardly during a certain period of each rotation of the drum, and means for drawing the arms inwardly and forcing their outer ends downwardly during the remaining portion of each rotation of the drum.

5. A device of the kind described comprising a rotatable drum having a depending slotted flange, loosely pivoted slidable arms carried by the drum and working in said slots, means for normally moving the arms outwardly and elevating their outer ends, a curved track having its highest point midway its ends, rollers carried by the arms and traveling upon said track, a cam track arranged adjacent the first mentioned track and curving inwardly toward the center of the drum, and rollers carried by the arms and engaging the inner sides of said cam track.

JOHN GIERKE.

Witnesses:.
   A. GROUX,
   H. D. MARSIL.